(12) United States Patent  
Halasy-Wimmer et al.

(10) Patent No.: US 7,325,658 B2
(45) Date of Patent: Feb. 5, 2008

(54) ACTUATOR UNIT FOR AN ELECTROMECHANICALLY ACTUATABLE DISK BRAKE

(75) Inventors: Georg Halasy-Wimmer, Markgröningen (DE); Paul Linhoff, Neu-Anspach (DE); Bernhard Schmittner, Hösbach (DE); Jürgen Fölkel, Frankfurt (DE); John Miessner, Berlin (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 318 days.

(21) Appl. No.: 10/549,097

(22) PCT Filed: Mar. 17, 2004

(86) PCT No.: PCT/EP2004/050321

§ 371 (c)(1),
(2), (4) Date: Sep. 13, 2005

(87) PCT Pub. No.: WO2004/083670

PCT Pub. Date: Sep. 30, 2004

(65) Prior Publication Data

US 2006/0180413 A1  Aug. 17, 2006

(30) Foreign Application Priority Data

Mar. 18, 2003 (DE) ................ 103 11 741
Mar. 18, 2003 (DE) ................ 103 11 745

(51) Int. Cl.
*F16D 55/08* (2006.01)
(52) U.S. Cl. .............. 188/158; 188/72.8; 188/162
(58) Field of Classification Search ........... 188/71.8, 188/71.9, 72.7, 72.8, 158–162
See application file for complete search history.

(56) References Cited

U.S. PATENT DOCUMENTS

| 4,809,824 A | * | 3/1989 | Fargier et al. ............. 188/72.8 |
| 5,086,884 A | * | 2/1992 | Gordon et al. ............. 188/71.9 |
| 5,107,967 A | | 4/1992 | Fujita et al. |
| 5,348,123 A | * | 9/1994 | Takahashi et al. ......... 188/72.1 |
| 6,012,556 A | * | 1/2000 | Blosch et al. .............. 188/71.8 |
| 6,142,265 A | * | 11/2000 | Reimann et al. ........... 188/158 |
| 6,407,474 B1 | | 6/2002 | Mahn et al. |
| 6,513,632 B2 | | 2/2003 | Peter |
| 6,761,252 B1 | * | 7/2004 | Weiler et al. .............. 188/72.7 |
| 6,810,316 B2 | * | 10/2004 | Yokoyama et al. ........... 701/70 |

FOREIGN PATENT DOCUMENTS

| DE | 10054938 | 5/2002 |
| WO | 9960285 | 11/1999 |
| WO | 0061962 | 10/2000 |

* cited by examiner

*Primary Examiner*—Chris Schwartz

(57) ABSTRACT

An actuating unit for an electromechanically actuatable disk brake for motor vehicles consists essentially of a drive unit (1), i.e., an electric motor (11); an actuating element (7), by means of which one (4) of two friction linings (4, 5) mounted with limited freedom of movement in a brake caliper can be brought into engagement with a brake disk (6); and a first and a second reducing gear (2, 3). An electronic controller (8), which serves to drive the electric motor (11), is assigned to the actuating unit.

To realize an actuating unit of compact axial dimensions which is also optimally designed with respect to packaging, at least part of the electronic controller (8) is mounted between the electric motor (11) and the housing (25) which holds the second reducing gear (3).

18 Claims, 3 Drawing Sheets

ACTUATOR UNIT FOR AN ELECTROMECHANICALLY ACTUATABLE DISK BRAKE

BACKGROUND OF THE INVENTION

The invention pertains to an actuating unit for an electromechanically actuatable disk brake for motor vehicles, the unit being mounted on a brake caliper. Two friction linings, each of which works together with one of the lateral surfaces of a brake disk, are mounted in the caliper with freedom to move within a limited range. An actuating element of the actuating unit brings one of the friction linings into engagement with the brake disk directly, whereas the other friction lining is brought into engagement with the brake disk indirectly through the action of the reaction force applied by the brake caliper. The actuating unit consists of an electric motor; a first reducing gear, which acts between the electric motor and the actuating element; and a second reducing gear, which acts between the electric motor and a part of the first reducing gear. The actuating unit also has an electronic controller, which serves to drive the electric motor.

An electromechanical actuating unit of this type is known from International Patent Application WO 00/61962. In the previously known actuating unit, the electronic controller is structurally separate from the actuating unit and is located apart from it.

The previously known actuating unit suffers in particular from the disadvantage that electrical lines with large cross sections are required to transmit the required electric power or current for all of the brake functions (service brake and parking braking functions). As a result, the distance between the actuating unit and the associated electronic controller is considered critical, especially when a brushless electric motor is used. The separate arrangement of the previously mentioned components also causes considerable problems with respect to packaging.

It is therefore the task of the present invention to propose an electromechanical actuating unit of the general type indicated above which is characterized by a significant reduction in the distance between the actuating unit and its associated electronic controller and by an optimized design with respect to packaging.

SUMMARY OF THE INVENTION

This task is accomplished according to the invention in that at least part of the electronic controller is mounted between the electric motor and the housing which holds the second reducing gear.

BRIEF DESCRIPTION OF THE DRAWINGS

The invention is explained in greater detail below in the following description of an exemplary embodiment with reference to the attached drawing.

DETAILED DESCRIPTION OF THE DRAWINGS

Figure 1:
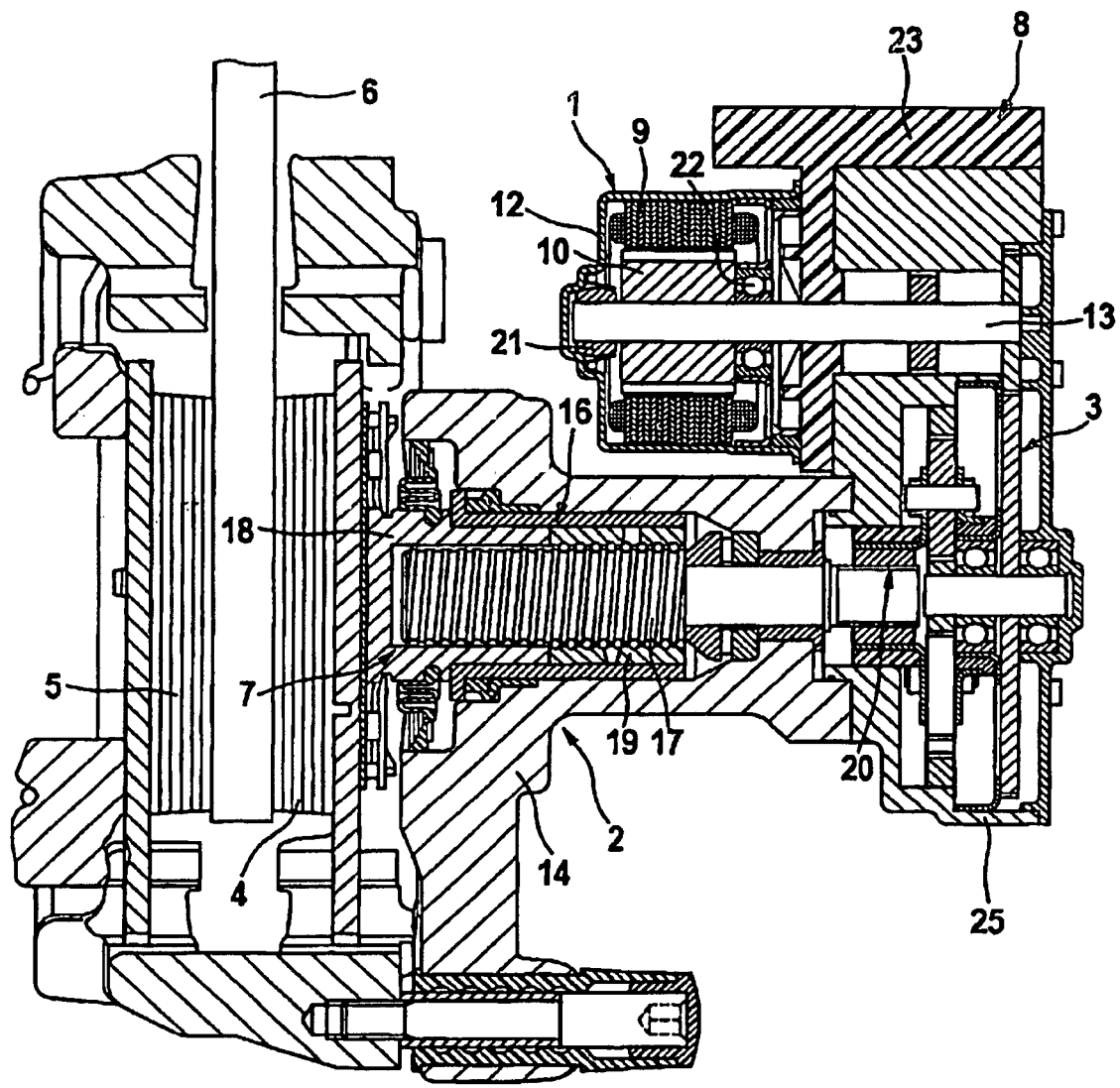
FIG. 1 shows an axial cross section of an embodiment of the inventive electromechanical actuating unit.

The inventive electromechanical actuating unit shown in the drawing is used to actuate a floating-caliper disk brake. The caliper of the brake, which is shown merely in schematic fashion, is supported with a certain freedom of movement in a stationary bracket (not shown). Two friction linings 4, 5 are mounted in the brake caliper in such a way that one faces the left, the other the right, lateral surface of a brake disk 6.

In the following, the friction lining 4 on the right in the drawing is referred to as the first friction lining, and the other friction lining, designated 5, is referred to as the second friction lining. Whereas the first friction lining 4 can be brought into engagement directly with the brake disk 6 by the actuating unit 7, the second friction lining 5 is pushed against the opposite lateral surface of the brake disk 6 by the action of the reaction force applied by the brake caliper when the arrangement is actuated. The inventive actuating unit, which is attached to the brake caliper by fastening means (not shown), has a modular design and consists essentially of four independent assemblies or modules, namely, a drive unit 1; a first reducing gear 2, which actuates the first friction lining 4; a second reducing gear 3, which acts between the drive unit 1 and the first reducing gear 2; and an electronic controller 8.

The previously mentioned drive unit 1 consists of an electric motor 11, which, in the example illustrated here, is designed as an electronically commutated motor excited by permanent magnets, the stator 9 of which is mounted permanently in a motor housing 12. The rotor 10 is connected to a shaft 13, which is in working connection with the second reducing gear 3. The first reducing gear 2 in the example shown here is designed as a ball screw, which is mounted in a gearbox housing 14. This housing could also be designed as an integral part of the previously mentioned brake caliper. The ball screw consists here of a threaded nut 16 and a threaded spindle 17. Several balls (not designated by a reference no.) are installed between the threaded nut 16 and the threaded spindle 17. These balls revolve when the threaded spindle 17 turns and cause the threaded nut to move in the axial or translational direction. The threaded nut 16 is preferably made up of two parts, namely, a first part 18, which forms the previously mentioned actuating element 7, and a second part 19, which includes a return area for the balls, which allows the balls to roll back load-free to the beginning of the raceway which carries them. It can also be derived from the drawing that the second reducing gear 3 is designed as an epicyclic gear.

The arrangement is preferably designed so that the rotor 10, i.e., the shaft 13, of the electric motor 11, acting by way of the second reducing gear 3, drives the threaded spindle 17, while the first part 18 of the threaded nut 16 is supported against the first friction lining 4. The first reducing gear 2 is coupled to the second reducing gear 3 by means of a torque-free plug-in connection, designated by the reference number 20, which, for example, can be designed as two sets of serrations. Two radial bearings 21, 22, which are installed in the motor housing, support the rotor 10.

As can also be seen in FIG. 1, the electronic controller 8 has a housing 23, made preferably of plastic, which is provided with a flange 24. As can be seen especially clearly in FIG. 2, this flange holds all of the electrical interfaces between the electric motor 11 and the electronic controller 8 and all of the mechanical interfaces between the electric motor 11 and the second reducing gear 3. The flange 24 is advantageously located between the electric motor 11 and the housing 25 which holds the second reducing gear 3. A position-detecting system (not shown here) is used to determine the actual position of the rotor 10.

Figure 2:
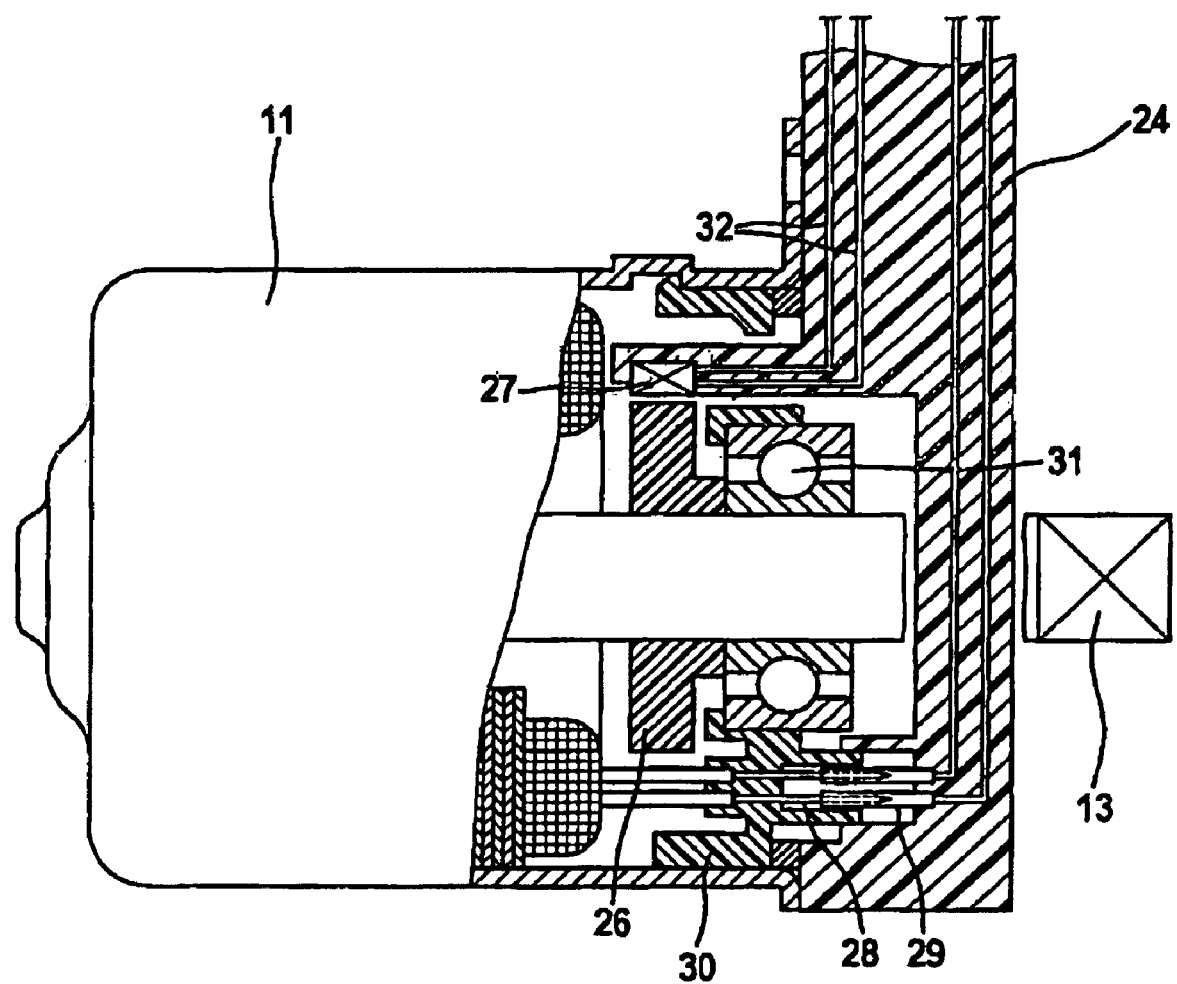
FIG. 2 shows a partial cross-sectional view of a first variant of the inventive electromechanical actuating unit.
Figure 3:
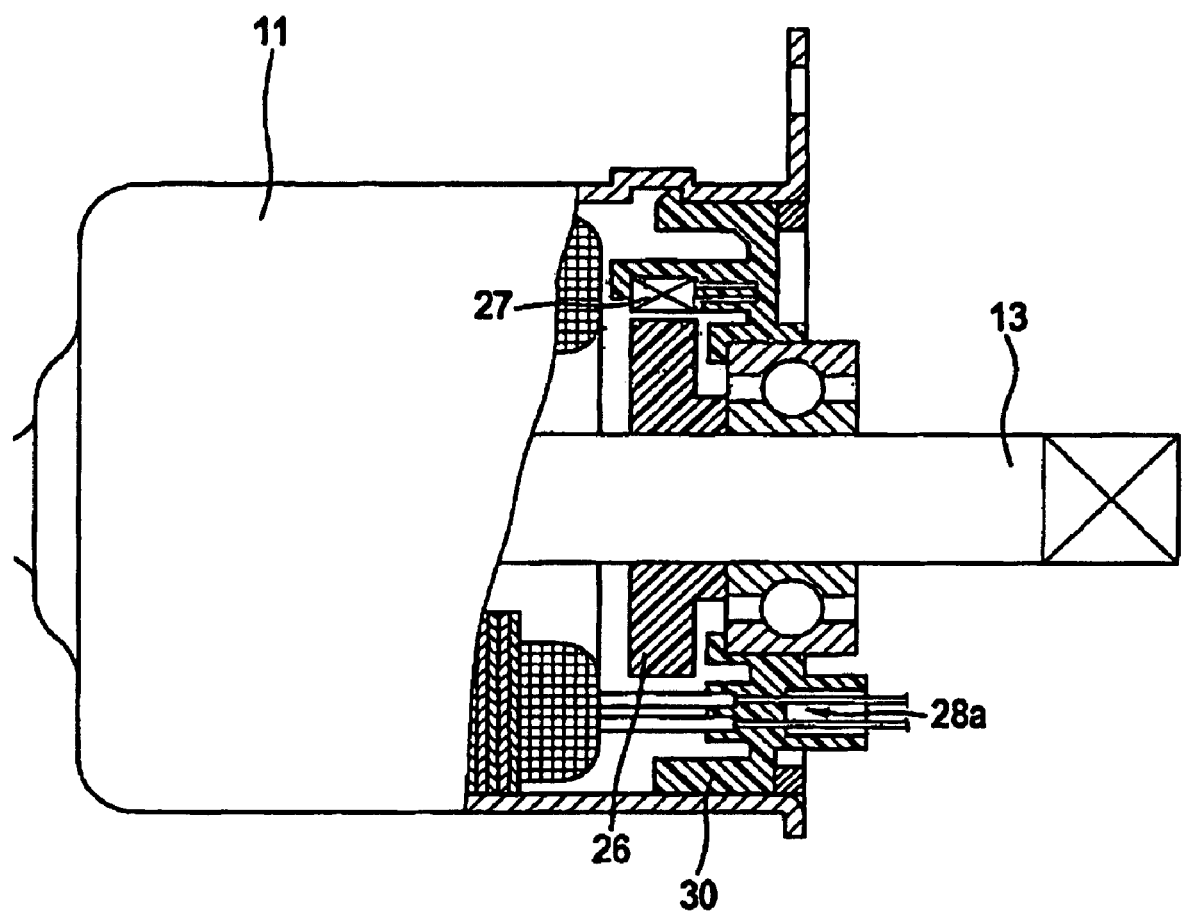
FIG. 3 shows a partial cross-sectional view of a second variant of the inventive electromechanical actuating unit.

As can be seen especially in FIGS. 2 and 3, the position-detecting system is formed essentially by an encoder wheel 26, mounted on the shaft 13, and a sensor element 27. A Hall sensor, for example, or a magnetoresistive element can be used as the sensor element 27. In the embodiment shown in FIG. 2, the sensor element 27 is connected permanently to the housing 23 of the electronic controller 8, i.e., to its flange 24. In another embodiment (not shown), the sensor element is mounted with a certain limited freedom of movement with respect to the housing of the electronic controller and is connected to it by means of an elastic fastening. The previously mentioned electrical interface between the electric motor 11 and the electronic controller 8, which serves to supply power to the electric motor 11, is, in the example shown here, designed as a plug-and-socket connection 28, 29. The plug or male part 28 is assigned to the electric motor 11 and is designed as a component of an end plate 30, which holds the bearing 31 which supports the shaft 13. In contrast, the socket or female part 29 is assigned to the electronic controller 8 and is designed as a component of the flange 24, preferably molded into the flange 24. The electrical lines 32 connecting the sensor element 27 to other components of the electronic controller 8 are embedded in the plastic of which the housing 23 of the electronic controller 8 is made.

In the modified embodiment shown in FIG. 3, the sensor element 27 is integrated into the previously mentioned end plate 30. The plug or male part 28a not only supplies power to the electric motor 11 but also provides the contact for the sensor element 27.

Numerous modifications are, of course, possible without abandoning the scope of the present invention. For example, the electric motor serving as the drive unit 1 could also be designed as a switched reluctance motor (SR-motor). Other designs of the epicyclic gear are also conceivable, such as, for example, a two-stage differential epicyclic gear or a gear with planet wheels which engage by their first stage with a sun wheel and by their second stage with an internal gearwheel by means of intermediate spur gearwheels. Conceivable also, of course, are gears which produce large reductions by means of a deformable, toothed ring and an eccentric arrangement.

LIST OF REFERENCE NUMBERS 1 drive unit
2 reducing gear
3 reducing gear
4 friction lining
5 friction lining
6 brake disk
7 actuating element
8 controller
9 stator
10 rotor
11 electric motor
12 motor housing
13 shaft
14 gearbox housing
15
16 threaded nut
17 threaded spindle
18 part
19 part
20 plug-and-socket connection
21 radial bearing
22 radial bearing
23 housing
24 flange
25 gearbox housing
26 encoder wheel
27 sensor element
28 plug
29 socket
30 end plate
31 bearing

The invention claimed is:

1. An actuating unit for an electromechanically actuatable disk brake for motor vehicles mounted on a brake caliper, with two friction linings (4, 5) being mounted in the caliper with freedom to move within a limited range, each of which works together with one of the lateral surfaces of a brake disk (6), where an actuating element (7) of the actuating unit brings one of the friction linings (4) into engagement with the brake disk (6) directly, whereas the other friction lining (5) is brought into engagement with the brake disk (6) indirectly through the action of the reaction force applied by the brake caliper, where the actuating unit consists of an electric motor (11); a first reducing gear (2), which acts between the electric motor (11) and the actuating element (7); and a second reducing gear (3), which acts between the electric motor (11) and a part of the first reducing gear (2) and is held in place by a housing, and where an electronic controller, which serves to drive the electric motor, is also assigned to the actuating unit, wherein at least part of the electronic controller (8) is mounted between the electric motor (11) and the housing (25) which holds the second reducing gear (3).

2. The actuating unit according to claim 1, wherein the electronic controller (8) has a housing (23) with a flange (24), which is mounted between the electric motor (11) and the housing (25) for the second reducing gear (3) and holds all of the electrical interfaces between the electric motor (11) and the electronic controller (8) and the mechanical interfaces between the electric motor (11) and the second reducing gear (3).

3. The actuating unit according to claim 2, wherein the electrical interface between the electric motor (11) and the electronic controller (8) is designed as a plug-and-socket connection (28, 29).

4. The actuating unit according to claim 3, wherein the plug or male part (28) is assigned to the electric motor (11), whereas the socket or female part (29) is assigned to the electronic controller (8).

5. The actuating unit according to claim 4, wherein the socket or female part (29) is molded into the flange (24).

6. The actuating unit according to claim 3, wherein the electrical interface (28, 29) serves to supply power to the electric motor (11).

7. The actuating unit according claim 1, wherein the electric motor (11) is designed as a brushless, electronically commutated direct-current motor, and wherein a sensor arrangement (26, 27) is provided for sensing the position of the rotor of the electric motor (11).

8. The actuating unit according to claim 7, wherein the sensor arrangement (26, 27) for sensing the position of the rotor of the electric motor (11) comprises an encoder wheel (26) mounted on the shaft (13) of the electric motor (11) and a sensor element (27), which cooperates with the encoder wheel (26).

9. The actuating unit according to claim 8, wherein the sensor element (27) is mounted on an end plate (30), which closes off the electric motor (11), carries an electrical connector (28), and serves to support the shaft (13) of the electric motor (11).

10. The actuating unit according to claim 9, wherein the electrical connector is a plug (28) which serves as an electrical contact for the sensor element (27).

11. The actuating unit according to claim 8, wherein the sensor element (27) is permanently connected to the housing (23) of the electronic controller (8).

12. The actuating unit according to claim 8, wherein the sensor element (27) is mounted with a certain limited freedom of movement with respect to the housing (23) of the electronic controller (8) and is connected to it by means of an elastic fastening.

13. The actuating unit according to claim 1, wherein a torque-free plug-in connection (20), is provided between the first (2) and the second reducing gear (3).

14. The actuating unit according to claim 13, wherein the plug-in connection (20) is designed at the end of the drive element (spindle) (17) of the first reducing gear (2).

15. The actuating unit according to claim 1, wherein the electric motor (11) and a part of the second reducing gear (3) are radially offset from the longitudinal axis of the first reducing gear (2).

16. The actuating unit according to claim 15, wherein the electric motor (11) and a part of the second reducing gear (3) are axially parallel to the longitudinal axis of the first reducing gear (2).

17. The actuating unit according to claim 1, wherein an additional electrical interface is provided between the first gear and the second gear to connect electrically a force-sensing element mounted in the first gear to the electronic controller.

18. The actuating unit according to claim 17, wherein the interface also serves the additional purpose of fastening the electronic controller mechanically to the brake caliper.

* * * * *